United States Patent
Ramshaw et al.

(10) Patent No.: US 7,014,820 B2
(45) Date of Patent: Mar. 21, 2006

(54) ROTATING SURFACE OF REVOLUTION REACTOR WITH FEED AND COLLECTION MECHANISMS

(75) Inventors: Colin Ramshaw, Ponteland (GB); Roshan Jeet Jee Jachuck, Abbey Farm (GB); Michael Jones, Orwell Royston (GB); Ian Henderson, Stokesley (GB)

(73) Assignee: Protensive Limited, Cambridge (GB)

( * ) Notice: Subject to any disclaimer, the term of this patent is extended or adjusted under 35 U.S.C. 154(b) by 165 days.

(21) Appl. No.: 10/204,331

(22) PCT Filed: Feb. 15, 2001

(86) PCT No.: PCT/GB01/00634

§ 371 (c)(1),
(2), (4) Date: Dec. 9, 2002

(87) PCT Pub. No.: WO01/60511

PCT Pub. Date: Aug. 23, 2001

(65) Prior Publication Data

US 2003/0161767 A1    Aug. 28, 2003

(30) Foreign Application Priority Data

| Feb. 17, 2000 | (WO) | ..................... PCT/GB00/00519 |
| Feb. 17, 2000 | (WO) | ..................... PCT/GB00/00521 |
| Feb. 17, 2000 | (WO) | ..................... PCT/GB00/00523 |
| Feb. 17, 2000 | (WO) | ..................... PCT/GB00/00526 |
| Feb. 27, 2000 | (WO) | ..................... PCT/GB00/00524 |

(51) Int. Cl.
*B32B 27/04*  (2006.01)
*B01F 23/90*  (2006.01)

(52) U.S. Cl. ..................... 422/135; 422/138; 422/224
(58) Field of Classification Search ................ 422/135, 422/138, 186, 186.3, 224
See application file for complete search history.

(56) References Cited

U.S. PATENT DOCUMENTS

| 1,284,488 | A |   | 11/1918 | Steward |
| 3,261,595 | A |   | 7/1966  | Trobeck |
| 3,902,857 | A | * | 9/1975  | Vander Mey et al. ........ 422/135 |
| 4,311,570 | A | * | 1/1982  | Cowen et al. .......... 204/157.41 |
| 4,356,133 | A | * | 10/1982 | Cowen et al. .......... 204/157.41 |
| 4,549,998 | A | * | 10/1985 | Porter et al. ................... 261/88 |
| 4,584,064 | A |   | 4/1986  | Ciais et al. |

(Continued)

FOREIGN PATENT DOCUMENTS

| DD | 139 994 A    | 2/1980  |
| EP | 0 020 055 A  | 12/1980 |
| GB | 1 080 863 A  | 8/1967  |
| WO | WO/87/07524  | 12/1987 |

*Primary Examiner*—N. Bhat
(74) *Attorney, Agent, or Firm*—Garvey,Smith,Nehrbass & North, L.L.C.; Seth M. Nehrbass; Brett A. North

(57) ABSTRACT

A reactor including a rotatable disc (3) having a region (13) in an upper surface (5) thereof. Reactant (15) is supplied to the region (13) by way of a feed (4), the disc (3) is rotated at high speed, and the reactant (15) moves from the region (13) so as to form a film (17) on the surface (5). As the reactant (15) traverses the surface (5) of the disc (3), it undergoes chemical or physical processes before being thrown from the periphery of the disc (3) into collector means (7).

13 Claims, 8 Drawing Sheets

U.S. PATENT DOCUMENTS

| | | |
|---|---|---|
| 4,627,803 A | 12/1986 | Umetsu |
| 6,482,960 B1 * | 11/2002 | Brechtelsbauer et al. ... 549/332 |
| 6,515,153 B1 * | 2/2003 | Burns et al. ................... 554/69 |
| 6,740,763 B1 * | 5/2004 | Nowak et al. .............. 549/526 |
| 2003/0139543 A1 * | 7/2003 | Wilhelm et al. .............. 526/65 |

* cited by examiner

ROTATING SURFACE OF REVOLUTION REACTOR WITH FEED AND COLLECTION MECHANISMS

The present invention relates to a rotating surface of revolution reactor provided with various feed and collection mechanisms for input and output products.

The invention makes use of rotating surfaces of revolution technology (hereinafter RSORT) (commonly known as spinning disc technology).

The spinning disc concept is an attempt to apply process intensification methods within the fields of heat and mass transfer. The technology operates by the use of high gravity fields created by rotation of a disc surface causing fluid introduced to the dire surface at its axis to flow radially outward under the influence of centrifugal acceleration in the form of thin often wavy films. Such thin films have been shown to significantly improve the heat and mass transfer rates and mixing. The technology was developed for typical heat and mass transfer operations such as heat exchanging, heating, cooling and mixing, blending and the like, for example as disclosed in R J J Jachuck and C Ramshaw, "Process Intensification: Heat transfer characteristics of tailored rotating surfaces", Heat Recovery Systems & CHP, Vol. 14, No 5, p475–491, 1994.

More recently the technology has been adapted for use as a reacting surface for systems which are heat and mass transfer limited, for example for the reaction of substrates which are highly viscous during at least a stage of the reaction and cause problems in achieving good mixing and product yields.

Boodhoo, Jachuck & Ramshaw disclose in "Process Intensification: Spinning Disc Polymeriser for the Manufacture of Polystyrene" the use of a spinning disc apparatus in which monomer and initiator is reacted by conventional means to provide a prepolymer which is then passed across the surface of a spinning disc at elevated temperature providing a conversion product in the form of polymerised styrene.

EP 0 499 363 (Tioxide Group Services Limited) discloses another use for spinning disc technology in photo catalytic degradation of organic materials such a hydrocarbons. A solution of salicylic acid and titanium dioxide catalyst was passed across the surface of a rotating disc and irradiated with ultra violet light.

These publications therefore disclose the use of spinning disc technology for heating and mass transfer in inert and reactive systems.

GB 9903474.6 (University of Newcastle), describes the use of RSORT in the conversion of a fluid phase substrate by dynamic heterogeneous contact with an agent. In this application, it is described how it has surprisingly been found that spinning disc technology may be further adapted to apply process intensification methods not only within the fields of heat and mass transfer but also within the field of heterogeneous contacting. Furthermore, it is described how it has surprisingly been found that the quality of the product obtained is of higher quality than that obtained by conventional processing having, for example, a higher purity or, in polymers, a narrower molecular distribution.

In addition to this, spinning disc technology can be used to obtain products not readily obtainable by other technology.

Various RSORT devices are disclosed in PCT/GB00/00524, PCT/GB00/00521, PCT/GB00/00526, PCT/GB00/00523 and PCT/GB00/519 (all University of Newcastle et al.), from which applications the present application claims priority and the full disclosures of which are hereby incorporated into the present application by reference.

According to a first aspect of the present invention, there is provided a reactor apparatus including a support element adapted to be rotatable about an axis, the support element having at least one surface, feed means for supplying at least one reactant to the at least one surface of the support element and collector means for collecting product from the at least one surface of the support element, characterised in that the feed means comprises a feed distributor having a plurality of spaced outlets.

According to a second aspect of the present invention, there is provided a reactor apparatus including a support element adapted to be rotatable about an axis, the support element having at least one surface, feed means for supplying at least one reactant to the at least one surface of the support element and collector means for collecting product from the at least one surface of the support element, characterised in that the feed means comprises at least one spray nozzle.

According to a third aspect of the present invention, there is provided a reactor apparatus including a support element adapted to be rotatable about an axis, the support element having at least one surface, feed means for supplying at least one reactant to the at least one surface of the support element and collector means for collecting product from the at least one surface of the support element, characterised in that the feed means is adapted to apply additional energy to the at least one reactant as it is supplied to the at least one surface.

It is to be understood that the term "reactant" is not limited to substances which are intended to undergo chemical reaction on the surface of the support element, but also includes substances which are intended to undergo physical or other processes such as mixing or heating. Similarly, the term "product" is intended to denote the substance or substances which are collected from the at least one surface of the support element, whether these have undergone chemical or physical processing or both. In addition, although it is envisaged that most reactants and products will be in the liquid phase, the apparatus can be used with any suitable fluid phase reactants and products, including combinations of liquid, solid and gaseous reactants and products. For example, solid phase substances in substantially free-flowing particulate form can have macroscopic fluid flow properties.

An RSORT apparatus (commonly known as a spinning disc reactor) generally includes within a conversion chamber a rotating surface or an assembly of a plurality of these which is rotated about an axis to effect transfer of one or more reactants from the axis preferably radially across the rotating surface.

An RSORT apparatus as hereinbefore defined comprising a rotating surface as hereinbefore defined has a number of advantageous constructional features according to the present invention.

The axis of rotation of the rotating surface or support member may be substantially vertical, in which case gravity tends to pull reactants downwardly with respect to the surface or support member. This may be advantageous with less viscous reactants. Alternatively, the axis of rotation may be generally horizontal, which can achieve improved mixing of reactants provided that these are appropriately retained on the at least one surface of the support member.

Any suitable feed means may be provided to feed the at least one reactant onto the rotating surface. For example, the feed means may comprise a feed distributor in the form of a "shower head", a "necklace" of outlets. With particular regard to the second and third aspects of the present invention, the feed means may comprise a simple, preferably adjustable, single point introduction such as a "hose-pipe type" feed means or a spray nozzle or nozzles. Preferably, the feed means comprises a feed distributor having a plurality of uniformly spaced outlets for the at least one reactant on to the rotating surface as hereinbefore defined. The feed means may also include means for applying UV, IR, X-ray, RF, microwave or other types of electromagnetic radiation or energy, including magnetic and electric fields, to the reactants as they are fed to the trough, or may include means for applying vibration, such as ultrasonic vibration, or heat.

The feed means may be provided at any suitable position with respect to the rotating surface which allows feed of the reactant. For example, the feed means may be axially aligned with the rotating surface for axial feed. Alternatively, the feed means may be positioned such that the feed is spaced from the axis of the rotating surface. Such a position may lead to more turbulence and an enhanced mixing effect.

Advantageously, a matrix may be provided on regions of the at least one surface to which reactant is supplied so as to help the reactant to rotate with the support element, thereby helping to achieve substantially uniform flow from the regions across the at least one surface. The matrix may be in the form of a plug of fibrous mesh, such as metal or plastics wool, or may take the form of a plurality of projections which are secured to the at least one surface. Other matrix means will be apparent to the skilled reader. In some embodiments, the matrix is manufactured of a material which is inert with respect to the at least one reactant or the product and which is not significantly affected by temperature and other variable process conditions. Alternatively, the matrix may be made of a material which does interact with the at least one reactant or the product, such as a heterogeneous catalyst (e.g. nickel, palladium or platinum or any suitable metal or alloy or compound thereof). Where the matrix is made out of an electrically conductive material, it may be possible to supply an electric current therethrough and thus to provide heating means for heating the at least one reactant.

In a further embodiment, there may be provided a plurality of feeds adapted selectively to supply one or more reactants to a plurality of regions of the at least one surface. For example, where the support element is generally disc-like and has a substantially central axis of rotation, there may be provided a first central region of the at least one surface and feed means for supplying at least one reactant to the first region, and at least one further feed means for supplying a second reactant, which may be the same as or different from the first reactant, to a further region, which may be generally annular and radially spaced from the first region. It will be apparent to the skilled reader that a plurality of feeds and regions may be provided in a similar manner for support elements with shapes other than generally disc-like.

By providing a plurality of feeds, a sequence of reactions can be performed across the at least one surface of the support element. For example, two reactants may be supplied to a first central region of the at least one surface in which some mixing and reaction will take place. As the support element rotates, the reactants will spread from the first region and across the at least one surface of the support element, where further reaction and mixing takes place, and thence to a second annular region concentric with the first region. A third reactant may then be supplied to the second region, and further mixing and reaction will take place as the third reactant and the two initial reactants and any associated product are spread from the second region across the at least one surface of the support element for further mixing and reaction. Because the direction of travel of the reactants and products is outwards from the axis of rotation, a controlled series of reactions can be carried out across the at least one surface of the support member.

In some embodiments, one of the reactants may be a liquid phase component and another may be a gaseous phase component. In these embodiments, the rotating support member is advantageously contained within a vessel so as to allow the concentration of the gaseous phase component in the vicinity of the surface to be controlled. The liquid component may be fed to the surface of the disc as described above, and the gaseous component supplied to the vessel. A rotary impeller or fan or similar device may be mounted close to the rotating surface and driven so as to suck the gaseous phase component from a region surrounding the periphery of the rotating surface towards the centre of the rotating surface while the liquid phase component travels from the centre of the surface towards its periphery due to the rotation of the rotating surface. Where, for example, the support element is a disc, the impeller or fan may take the form of a generally disc shaped structure mounted coaxially with the support element and close thereto. A surface of the impeller or fan facing the rotating surface of the support element may be provided with blades or vanes such that rotation of the impeller or fan serves to suck the gaseous phase component from a periphery of the surface and the impeller or fan towards the centre of the surface. By providing a counter-current flow of the gaseous and liquid phase components, heat or mass transfer between the components is much improved, since the concentration of unreacted liquid phase reactant is lowest at the periphery of the disc, and therefore benefits from a high concentration of the gaseous phase component so as to ensure full reaction.

According to a fourth aspect of the present invention, there is provided a reactor apparatus including a support element adapted to be rotatable about an axis, the support element having at least one surface, feed means for supplying at least one reactant to the at least one surface of the support element and collector means for collecting product from the at least one surface of the support element, characterised in that at least a portion of the collector means displays catalytic activity with respect to the product.

Any suitable collection means may be provided for collection of the product as it leaves the rotating surface at its periphery. For example, there may be provided a receptacle in the form of a bowl or trough at least partially surrounding the rotating element or other fixed part of the apparatus. The collection means may additionally comprise a deflector positioned around the periphery of the rotating surface to deflect product into the collection means. The deflector is preferably positioned at an acute angle to the rotating surface.

The components of the collection means, such as the bowl or trough or deflector, may be coated or otherwise provided with a heterogeneous catalyst appropriate to the product formed by the reactants being reacted on the support element, or may even consist entirely of a material which acts as a heterogeneous catalyst. Furthermore, the components of the collection means may be heated or cooled to a predetermined temperature so as to enable control over reaction parameters, for example by serving to halt the reaction between reactants as these leave the at least one surface in the form of product. Feed means for supplying a reactant to the product leaving the at least one surface may also be provided. For example, there may be provided feed means for feeding a quenching medium to product in the collection means so as to halt chemical or other reactions between reactants when these have left the at least one surface.

The collection means may further comprise outlet means of any suitable form. For example, there may be a single collection trough running around the periphery of the disc or a collection bowl partially surrounding the rotating element.

Outlet means may also be provided in the collection means and these may take the form of apertures of any size and form situated at any suitable position of the collection means to allow egress of the product. In one preferred embodiment, the outlet means are situated to allow vertical egress of the substrate in use.

Alternatively, the collection means may comprise an outer wall provided at the periphery of the support element so as to prevent product from being thrown from the at least one surface, and at least one pitot tube which extends into the product which is restrained at the periphery of the support element by the outer wall. The outer wall may converge generally towards the axis of rotation of the support member so as better to retain product while the support element is undergoing rotation, although other wall configurations, such as generally parallel to or divergent from the axis of rotation may also be useful.

Embodiments of the present invention may include multiple support elements, which may share a common axis of rotation and which may be mounted on a single rotatable shaft, or which may be provided with individual rotatable shafts. The collection means associated with any given support element may be connected to the feed means associated with any other given support element so as to link a number of support elements in series or parallel. In this way, a reaction may be conducted across a number of support elements in series or parallel. The collection means of a first support member may be directly connected to the feed means of a second support member, or may be connected by way of a processing unit such as a pump, extruder, heater or heat exchanger or any other appropriate device. This is especially useful when dealing with viscous products, such as those which are obtained in polymerisation reactions, since the viscous product of a first support element may be processed so as to acquire more favourable physical characteristics before being used as the reactant feed for a second support element.

For example, where the collection means comprises an outer wall on the at least one surface of the support element as described above, a number of support elements may be coaxially mounted on a single rotatable shaft so as to form a stack of support elements. A reactant feed is led to the trough of a first support element, and a collector in the form of a pitot tube has its tip located near the at least one surface of the first support element in the vicinity of the wall so as to take up product from this region. An end of the pitot tube remote from the tip is led to the trough of a second support element so as to allow the product of the first support element to serve as the reactant for the second support element, thereby allowing a number of reactions to take place in series. Alternatively, a number of parallel feeds may supply the same at least one reactant simultaneously to the troughs of a number of support elements and a number of parallel pitot tube collectors may gather product from a peripheral region of each support element, thereby allowing a reaction to take place across a number of support elements in parallel.

It is also envisaged that product collected from the periphery of a support element may be recycled as feed for that support element. This is useful for processes requiring an extended contact time for the reactants. The product may be fully or only partially recycled, depending on requirements.

Reference herein to a rotating surface is to any continuous or discrete planar or three-dimensional surface or assembly which rotates approximately or truly about an axis, and preferably is reference to an approximate or true rotating surface of revolution. An approximate rotating surface of revolution may comprise an asymmetric axis and/or deviation in the surface body and/or circumference creating an axially or radially undulating surface of revolution. A discrete surface may be in the form of a mesh, grid, corrugated surface and the like.

Reference herein to a substantially radially outward flowing film as hereinbefore defined is to any fluid film which may be created by dynamic contact of the fluid phase reactant and the rotating surface as hereinbefore defined, suitably the fluid phase reactant is contacted with the rotating surface at any one or more surface locations and caused to flow outwardly by the action of centrifugal force. A film may be a continuous annulus or may be a non-continuous arc at any radial location. The substrate may provide a plurality of films in dynamic contact with a rotating surface as hereinbefore defined.

For example, processes requiring extended contact time may be carried out in continuous manner with use of a recycle of fluid exiting at the periphery of the rotating surface towards the axis of the rotating surface enabling sequential passes of fluid across the surface. In continuous steady state operation an amount of fluid exiting the surface may be drawn off as product and an amount may be returned by recycle for further conversion with an amount of fresh reactant feed.

The process may be operated in single or plural stages. A plural stage process may comprise a first pre-process stage with further post-process or upgrading stages, and may be carried out batchwise with use of a single rotating surface as hereinbefore defined or may be carried out in continuous manner with multiple rotating surfaces in series.

Second or more reactants may be added to the feed reactant as it passes from one rotating assembly to the next or be added directly to the rotating assembly anywhere between the axis of rotation or the exit from the assembly. In certain cases a multi-step process may be achieved by reactant addition or additions between the axis of rotation and the exit of a single rotating assembly to achieve more than one process step in a single pass. It is also possible to have different regions of the rotating surface at different temperatures and conditions and have different surface geometries as appropriate to the process needs.

It will be apparent that operation of the invention may be controlled both by selection of a specific rotating surface for the support element and by selecting process variables such as temperature, speed of rotation, rate of reactant feed, conversion time and the like. Accordingly, embodiment of the invention may provide enhanced flexibility in process control including both conventional control by means of operating conditions, and additionally control by means of rotating surface type.

The apparatus may further comprise any suitable control system. Such a control system may regulate the temperature or contact time of reactants by means of speed of rotation, rate of substrate feed and other process parameters to obtain an optimum result.

The apparatus as hereinbefore defined may comprise means for optimising process conditions. For example, means for imparting an additional movement to the rotating surface, and thus to the reactant, may be provided. Such movement could be in any desired plane or plurality of planes and preferably comprises vibration. Any suitable vibration means may be provided, such as flexible mounting of the surface or off centre mounting, both inducing passive vibration or active vibration means, such as a mechanical element in contact with the rotating element and vibrating in a direction parallel to the rotating element axis. Preferably a passive vibration means is provided in the form of off centre mounting of the rotating element on its axis of rotation. Vibration may alternatively be provided by an ultrasonic emitter in contact with the rotating element for vibration in any desired plane or plurality of planes.

The rotating surface may have any shape and surface formation to optimise process conditions. For example the rotating surface may be generally planar or curved, frilled, corrugated or bent. The rotating surface may form a cone or be of generally frustoconical shape.

In one preferred embodiment the rotating surface is generally planar and preferably generally circular. The periphery of the rotating surface may form an oval, rectangle or other shape.

According to a fifth aspect of the present invention, there is provided a reactor apparatus including a first support element adapted to be rotatable about an axis, the first support element having at least one surface, feed means for supplying at least one reactant to the at least one surface of the first support element and collector means for collecting product from the at least one surface of the first support element, characterised in that the collector means comprises a second support element adapted to be rotatable about an axis and having at least one surface adapted to receive product from the first element.

Preferably, the first and second support elements are coaxial and are adapted for co- or counter-rotation. The at least one surface of the second support element is shaped so as surround a periphery of the at least one surface of the first support element so that product thrown from the first support element as it rotates will be received by the at least one surface of the second support element.

In a preferred embodiment at least one rotating surface may be provided as an inner surface of a cone. The apparatus may comprise at least one cone and at least one other rotating surface or at least one pair of facing cones positioned so as to allow a two-stage process with one or more reactants fed to each cone. Preferably product exits a smaller cone (or other surface of rotation) in a spray on to the surface of a larger cone (or other surface of rotation) by which it is at least partially surrounded and for the surface of which a further reactant is fed by feed means as hereinbefore defined, to allow mix of the product and reactant on the larger rotating surface. Preferably, means are provided such that the two cones counter-rotate. Such an arrangement enhances mixing and intimate contact of the reactants and reduces the required physical contact time. Alternatively, means are provided such that the cones co-rotate or one is stationary.

According to a sixth aspect of the present invention, there is provided a reactor apparatus including a pair of generally planar support elements mounted coaxially on an axis of rotation and having opposed facing surfaces, at least one of the support elements being rotatable about the axis, and each facing surface being provided with at least one wall which surrounds the axis of rotation and which extends towards but does not contact the opposed facing surface, each wall extending divergently from its surface towards the opposed surface with respect to the axis of rotation, and feed means for supplying at least one reactant to a region enclosed by the wall closest to the axis.

The two generally planar support elements may be mounted generally parallel to each other on the axis of rotation. The facing surfaces of the support elements may be provided with at least one generally circular wall defined about the axis of rotation, and preferably a plurality of concentric walls, the walls being divergent with respect to the axis of rotation of their respective support element. The walls on one support element are positioned out of phase with the walls on the other support element so that the walls fit between each other when the support elements are brought close together. Reactant is supplied to a region within the innermost wall on one of the support elements. Upon rotation of the support elements, the reactant will tend to move along an interior surface of the divergent wall towards a region within the next wall on the opposed support element, and thence onto an interior surface of the said next wall back towards the first support element. The reactant may continue to move back and forth between the support members so as to progress in a zig-zag manner in a generally radial direction away from the axis of rotation along the interior surfaces of the intermeshed walls towards an outer collection point as described above. In this way, a compact reactor with a high first surface area is achieved, the first surface consisting of the interior surfaces of all the concentric walls. The support elements may rotate together in a given direction, or may rotate at different speeds in the same direction, or may rotate at the same speed or at different speeds in opposed directions. Alternatively, one support element may rotate and the other may be stationary.

A rotating surface of any shape and surface formation as hereinbefore defined may be provided with surface features which serve to promote the desired process. For example, the surface may be micro or macro profiled, micro or macro porous, non stick, for example may have a release coating, may be continuous or discontinuous and may comprise elements such as mesh, for example woven mesh, reticulate foam, pellets, cloth, pins or wires, for enhanced surface area, enhanced or reduced friction effect, enhanced or reduced laminar flow, shear mixing of recirculation flow in axial direction and the like.

In one preferred embodiment, mixing characteristics of the rotating surface are enhanced by the above features or the like provided on or in the rotating surface. These may be provided in any suitable regular or random arrangement of grids, concentric rings, spider web or like patterns which may be suitable for a given application.

Alternatively or additionally to any other surface feature, radially spaced pins in the form of circles or segments of circles may be provided.

In another preferred embodiment, a porous surface coating is provided, which aids processing of certain reactants. Such a coating may be provided in combination with any other of the aforementioned surface features.

Surface features in the form of grooves may be concentric or may be of any desired radially spaced form. For example, the grooves may form "wavy" or distorted circles for maximised mixing.

Grooves may be parallel sided, or may have one or both sides which diverge to form undercut grooves or which converge to form tapered grooves. Preferably, the grooves are undercut to promote mixing.

Grooves may be angled to project towards or away from the axis of the rotating surface to enhance or reduce undercut or taper.

Energy transfer means may be provided for the rotating surface or reactant or product as hereinbefore described. For example heating means may be provided to heat the reactant, for example, as part of the feed means. Additionally, or alternatively heating means may be provided to heat the rotating element in the form of radiant or other heaters positioned on the face of the rotating element which does not comprise the rotating surface for conversion. Preferably, radially spaced, generally circular radiant heaters are provided.

Any preferred cooling or quenching means may be provided in a suitable position to cool the reacted substrate. For example cooling coils or a heat sink may provide cooling by heat exchange, or a reservoir of quench may provide cooling or reaction termination by intimate mixing in the collection means.

For a better understanding of the present invention and to show how it may be carried into effect, reference shall now be made by way of example to the accompanying drawings, in which:

BRIEF DESCRIPTION OF THE DRAWINGS

FIG. 1 illustrates a spinning disc apparatus of the present invention. The apparatus is enclosed in vessel (1) having at its axis a drive shaft (2) supporting a spinning disc (3). Feed means (4) provides reactant to an undercut annular trough (13) provided in the surface (5) of the disc (3) about its axis (6). Rotation of the disc (3) causes reactant to flow radially outwards, whereby it contacts the surface (5) of the spinning disc (3). Fluid is collected at the peripheral edges of the disc (3) by means of collection trough (7) and deflector (100) and may be rapidly quenched by means of cooling coils (8). The collection trough (7) and the deflector (100) are coated with a catalytic material. A skirt (9) prevents meniscal draw back of fluid contaminating the drive shaft mechanism. Inlet means (10) enable controlled environment conditions to the provided, for example a nitrogen atmosphere. Outlet vent means (11) enable the venting of atmospheric gases or gases evolved during operation. Observation means are provided by means of windows (12) to observe the progress of the conversion.

Figure 1:
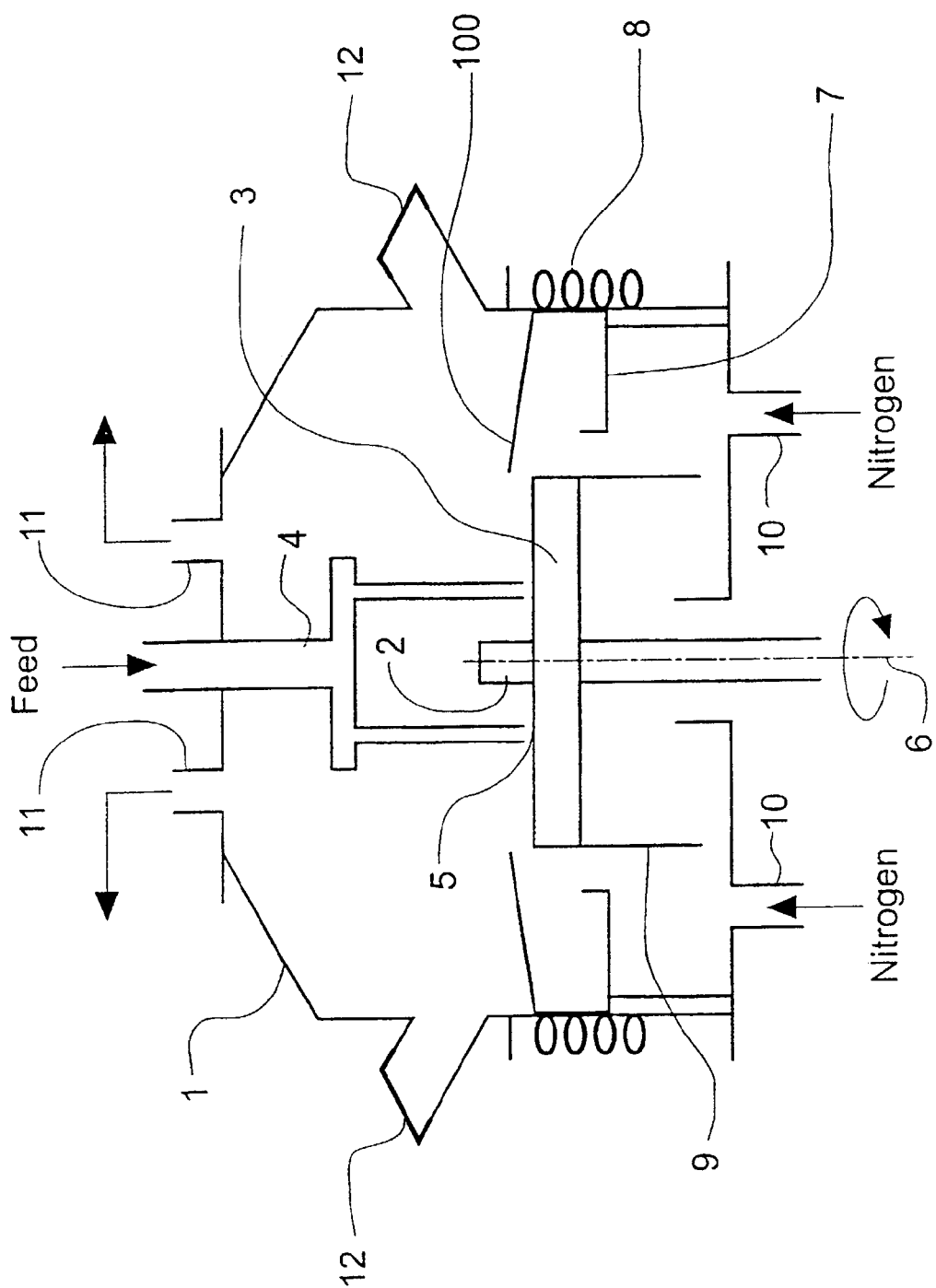
FIG. 1 shows a spinning disc apparatus in schematic form.

The apparatus of FIG. 1 may be started up and operated as described in Example 1 below. In the case that the process is an exothermic conversion, cooling coils (8) may be used to quench the collected product in the trough (7). The spinning disc (3) is provided with heating coils (not shown) which may be used to initiate or maintain conversion. The disc (3) or the reactor vessel (1) may be provided with a source of radiation, means for applying an electric or magnetic field and the like as described, at or above the disc surface (5) or at the wall of the reactor vessel (1).

Figure 2:
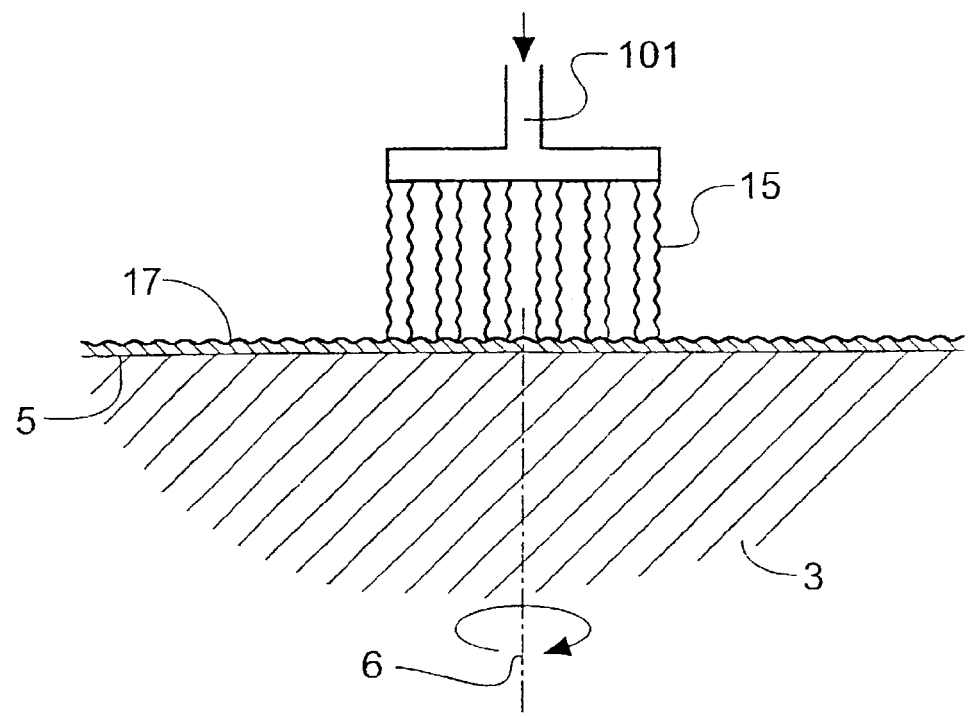
FIGS. 2 to 7 show a detail of a spinning disc with various feed mechanisms.

In FIG. 2 there is shown a detail of a disc (3) mounted on an axis of rotation (6) so as to form a rotating surface (5). Reactant (15) is supplied by a "shower head" feed (101) onto the surface (5) of the disc (3) and then forms a film (17) on the surface (5).

Figure 3:
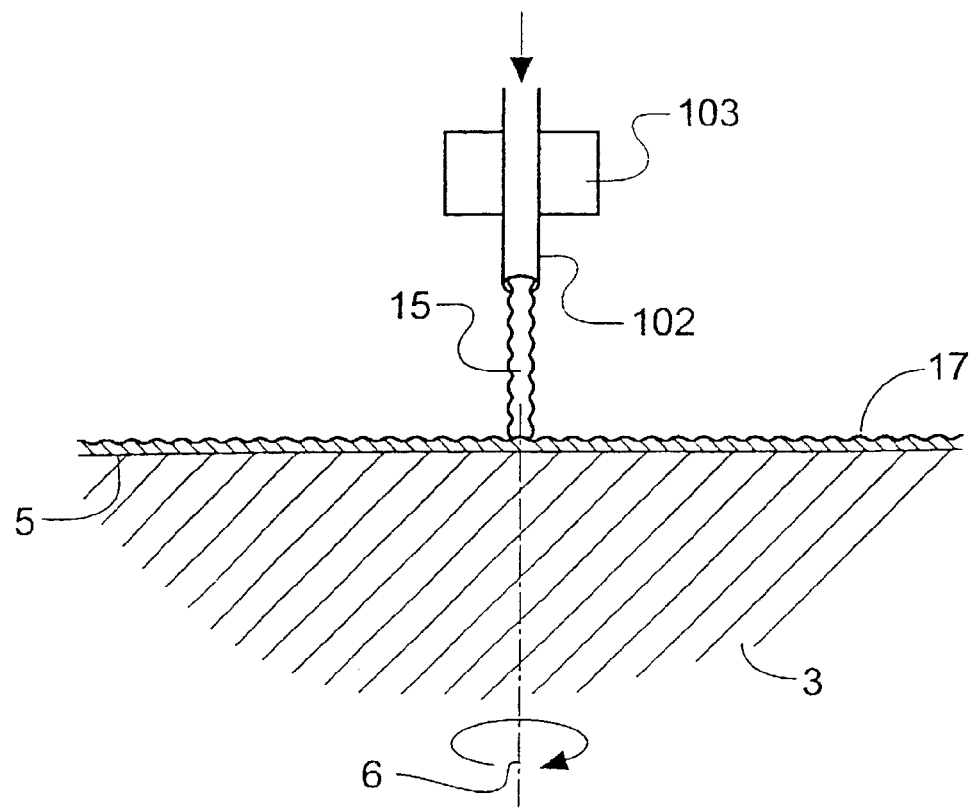

In FIG. 3 there is shown a detail of a disc (3) mounted on an axis of rotation (6) so as to form a rotating surface (5). Reactant (15) is supplied by a feed (102) onto the surface (5) of the disc (3) and then forms a film (17) on the surface (5). The feed (102) is fitted with a device (103) which is operable to apply additional energy to the reactant (15) as it is supplied to the surface (5). The device (103) may be adapted to apply electromagnetic radiation, a magnetic field or an electric field to the reactant (15). Alternatively, the device (103) may be a vibrator adapted to apply ultrasonic or mechanical vibration to the reactant (15).

Figure 4:
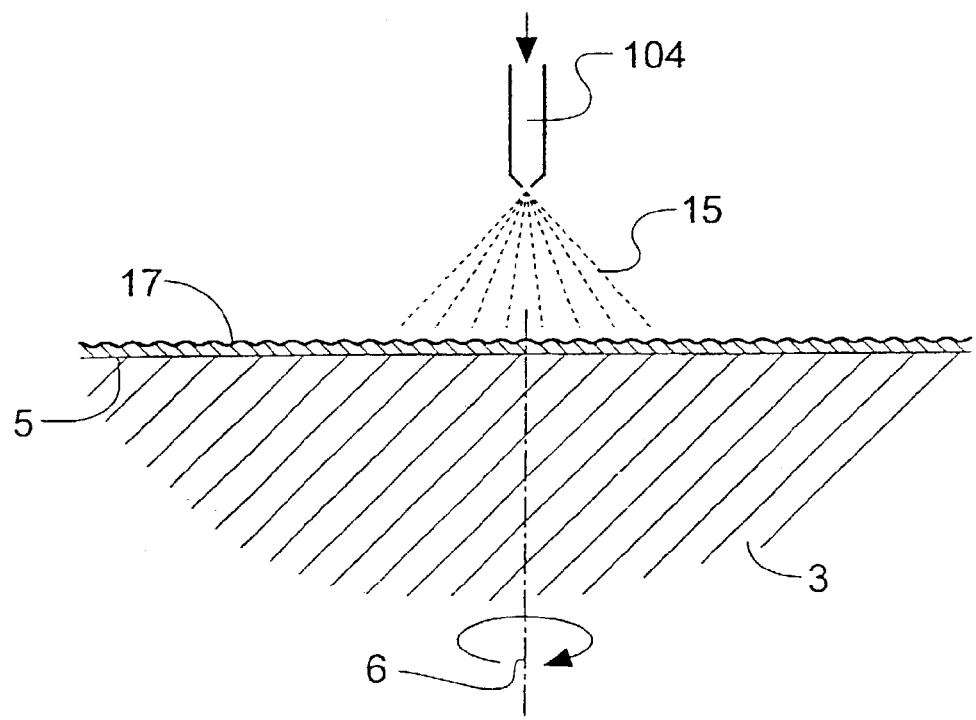

FIG. 4 shows a detail of a disc (3) mounted on an axis of rotation (6) so as to form a rotating surface (5). Reactant (15) is supplied by a spray nozzle feed (104) onto the surface (5) of the disc (3) and then forms a film (17) on the surface (5).

Figure 5:
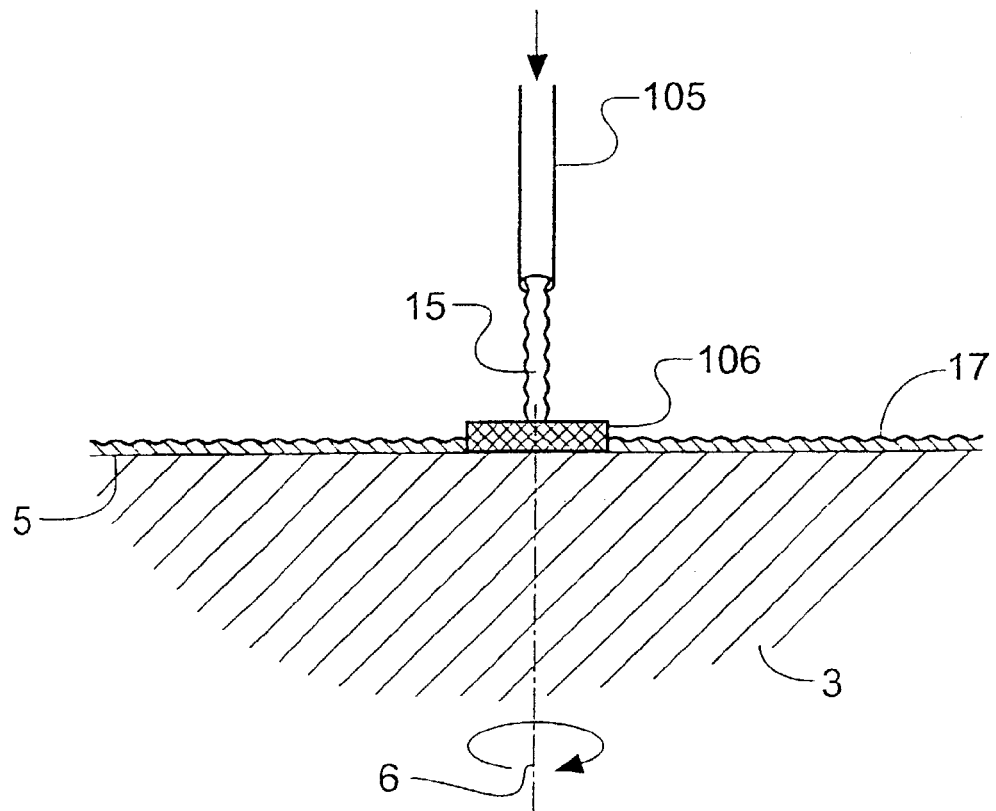

FIG. 5 shows a detail of a disc (3) mounted on an axis of rotation (6) so as to form a rotating surface (5). Reactant (15) is supplied by a feed (105) onto a matrix (106) made out of a metal mesh and located centrally on the surface (5) of the disc (3). The reactant (15) then spreads from the matrix (106) to form a film (17) on the surface (5).

Figure 6:
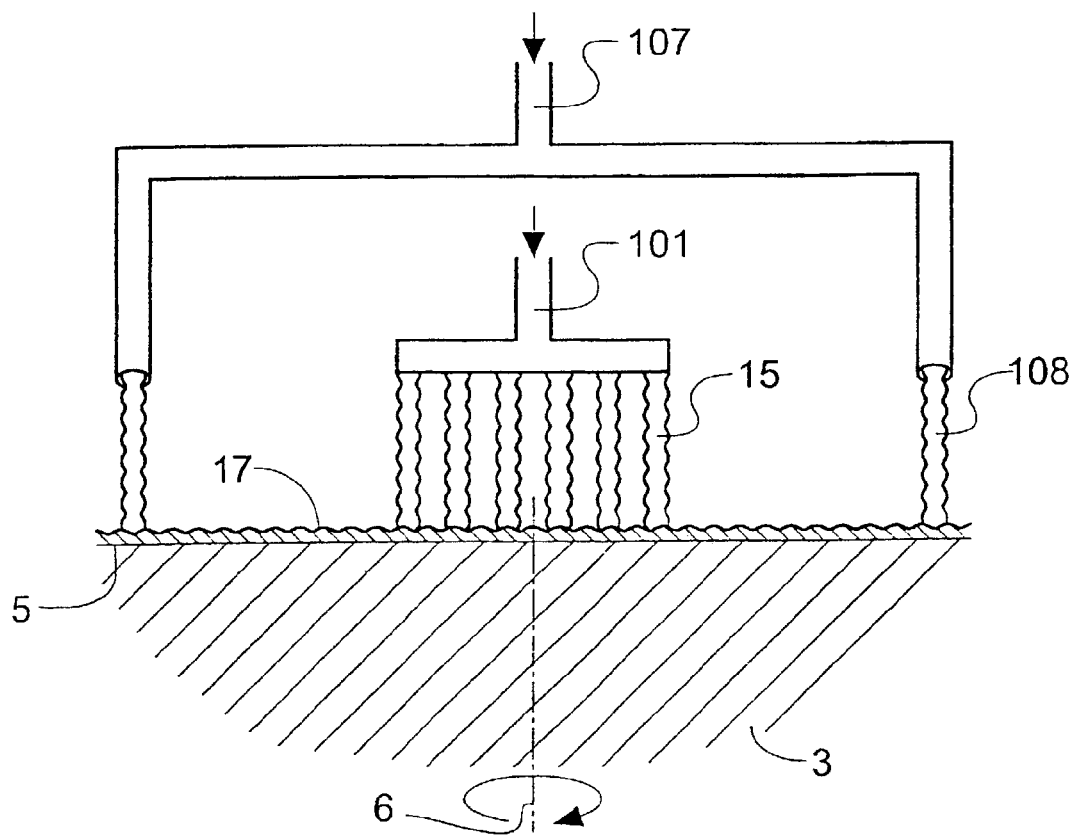

FIG. 6 shows a detail of a disc (3) mounted on an axis of rotation (6) so as to form a rotating surface (5). A first reactant (15) is supplied by a "shower head" feed (101) to a central part of the surface (5) of the disc (3) and then forms a film (17) on the surface (5). A further reactant (108) is supplied by a second feed distributor (107) to an annular region of the surface (5) radially spaced from the central part.

Figure 7:
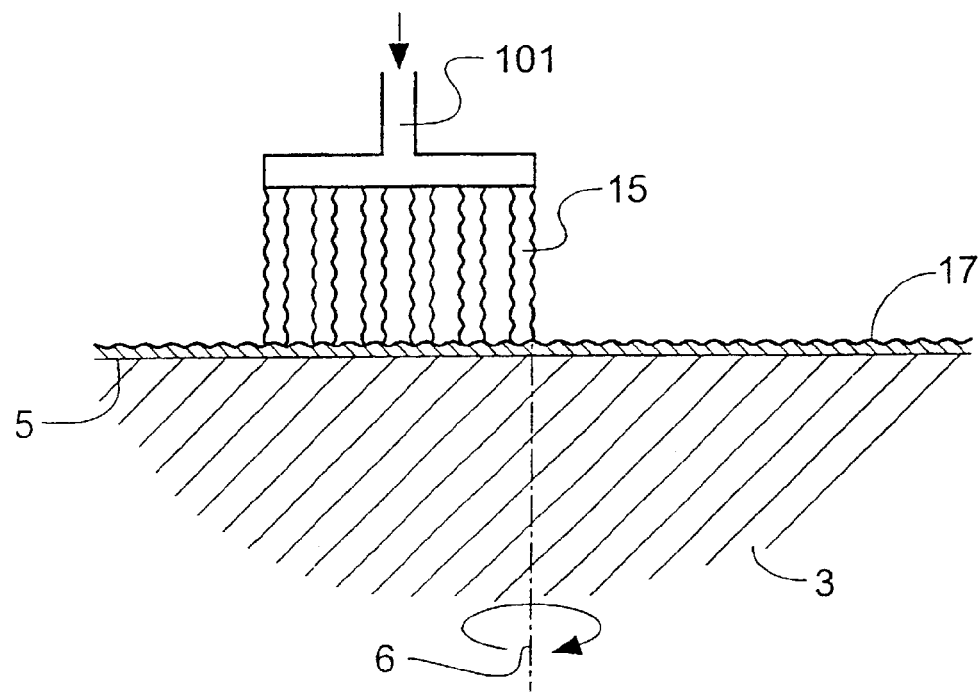

FIG. 7 shows a detail of a disc (3) mounted on an axis of rotation (6) so as to form a rotating surface (5). Reactant (15) is supplied by a "shower head" feed (101) onto an off-centre region of the surface (5) of the disc (3) and then forms a film (17) on the surface (5).

Figure 8:
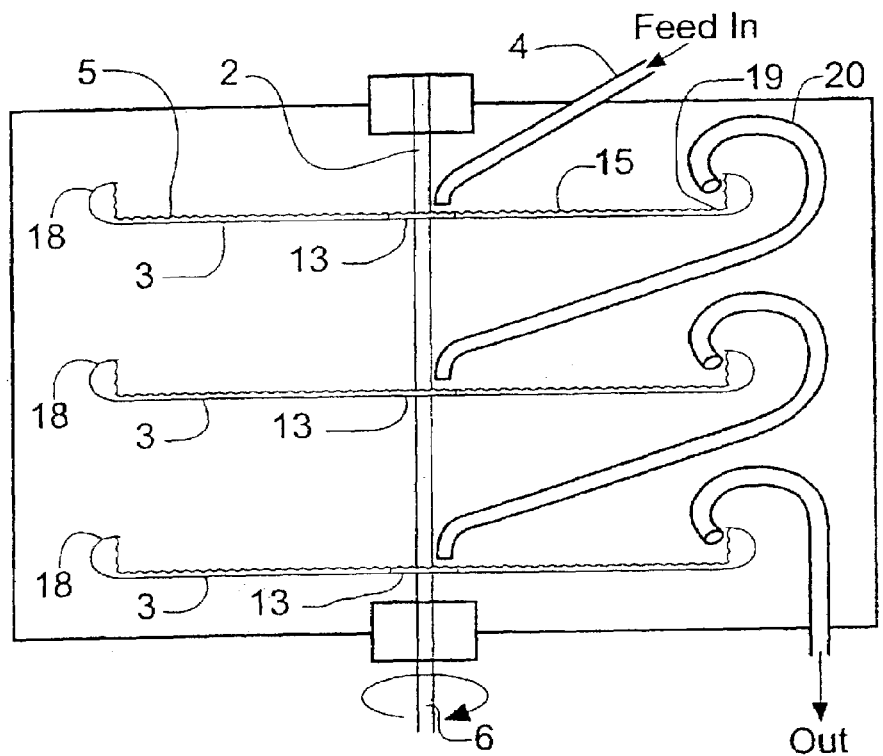
FIG. 8 shows a number of spinning discs in schematic form and operatively arranged in series.

FIG. 8 shows three discs (3) coaxially mounted on a drive shaft (2) which defines an axis of rotation (6). Each disc (3) has a central region (13) into which reactant (15) may be fed, and a peripheral wall (18). Reactant (15) is supplied to the central region (13) of the topmost disc (3) by way of feed means (4), and then spreads out over the surface (5) of the disc (3). Product (19) is collected from the vicinity of the peripheral wall (18) by way of a pitot tube collector (20), which then feeds product (19) to the central region (13) of the next disc (3) down on the drive shaft (2). In this way, a process can be performed across a number of discs (3) in series.

Figure 9:
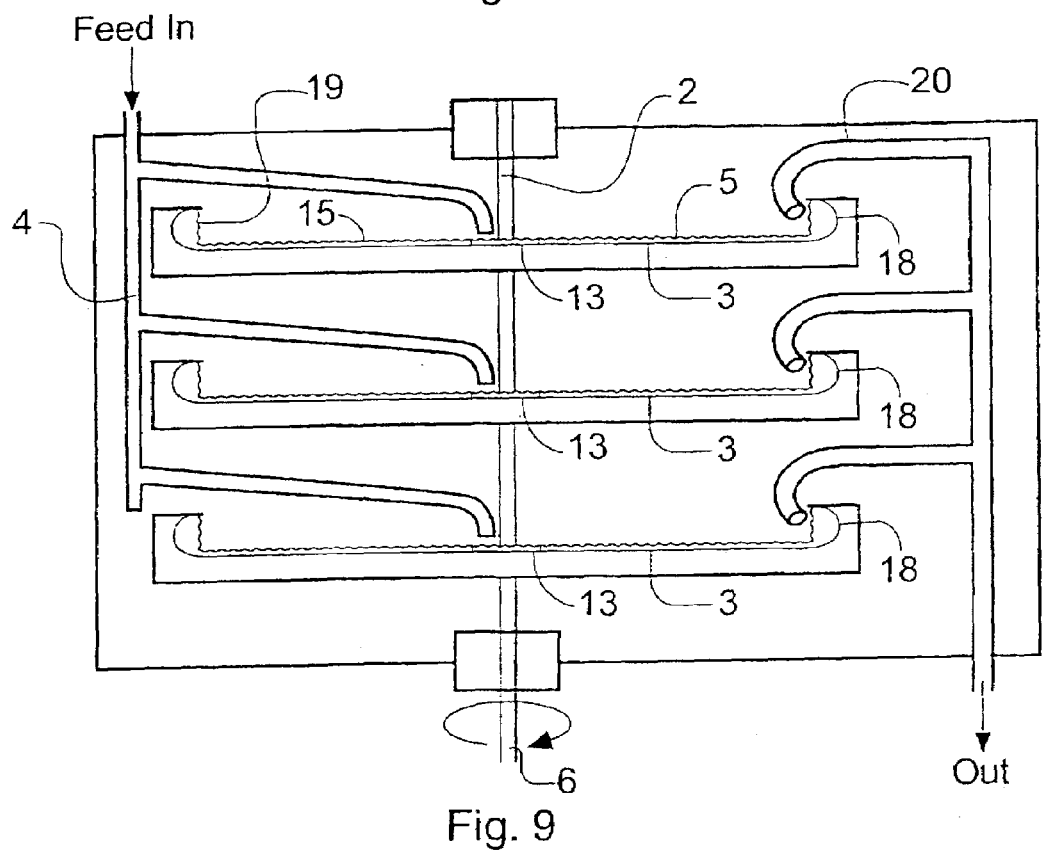
FIG. 9 shows a number of spinning discs in schematic form and operatively arranged in parallel.
Figure 10:
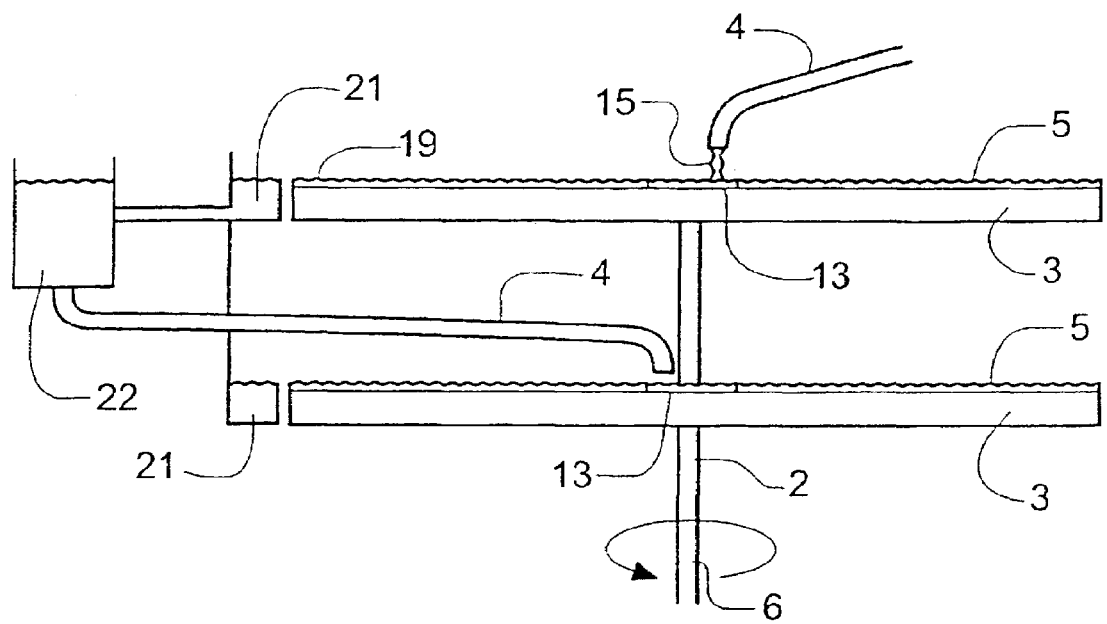
FIG. 10 shows two coaxial spinning discs in schematic form and provided with a pump unit for transferring product from one disc as feed to the second disc.

FIG. 9 shows three discs (3) coaxially mounted on a drive shaft (2) which defines an axis of rotation (6). Each disc (3) has a central region (13) into which reactant (15) may be fed, and a peripheral wall (18). Reactant (15) is supplied in parallel to the central region (13) of each disc (3) by way of feed means (4), and then spreads out over the surfaces (5) of the discs (3). Product (19) is collected from the vicinity of the peripheral walls (18) by way of pitot tube collectors (20), which are also connected in parallel. In this way, a process can be performed across a number of discs (3) in parallel FIG. 10 shows two discs (3) coaxially mounted on a drive shaft (2) which defines an axis of rotation (6). Each disc (3) has a central region (13) into which reactant (15) may be fed by feed means (4) before passing over the surface (5) of each disc (3). A collector trough (21) is provided about the periphery of each disc (3) so as to collect product (19) thrown from the discs (3). An outlet from the upper collector trough (21) passes through a pump or extruder (22) before leading to the central region (13) of the lower disc (3) as feed means (4). This arrangement is suitable for use with viscous reactants and products.

Figure 11:
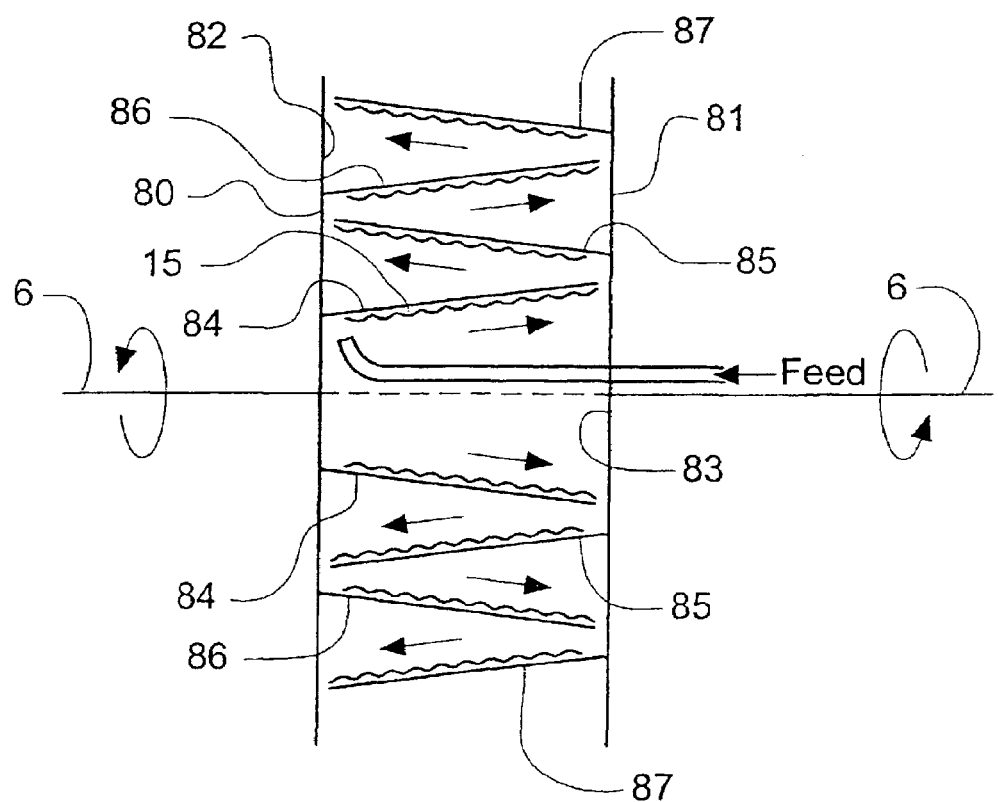
FIG. 11 shows two rotating support elements with intermeshing concentric circular walls.

FIG. 11 shows a pair of planar rotating support elements (80, 81) coaxially mounted on an axis of rotation (6). The facing surfaces (82, 83) of the support elements (80, 81) are each provided with a plurality of concentric circular walls (84, 85, 86, 87), with walls (84, 86) mounted on surface (82) and walls (85, 87) mounted on surface (83). The walls (84, 85, 86, 87) are divergent with respect to the axis of rotation of their respective support element (80, 81) and are positioned so that they mesh with each other when the support elements (80, 81) are brought together as shown. Reactant (15) is supplied to an interior region of wall (84) near surface (82) by a feed (4), and then proceeds to travel along an interior surface of wall (84) towards surface (83). When the reactant (15) reaches the top of wall (84), it spills over onto an interior surface of wall (85) on support element (81) and travels back towards support element (80) as shown. This process is repeated until the reactant (15) is thrown from the top of the outermost wall (87) into collecting means (not shown). By providing a convoluted surface along which the reactant (15) may travel, a very compact reactor may be obtained. The support elements (80, 81) may co- or counter-rotate, either at the same or at different rotational speeds.

Figure 12:
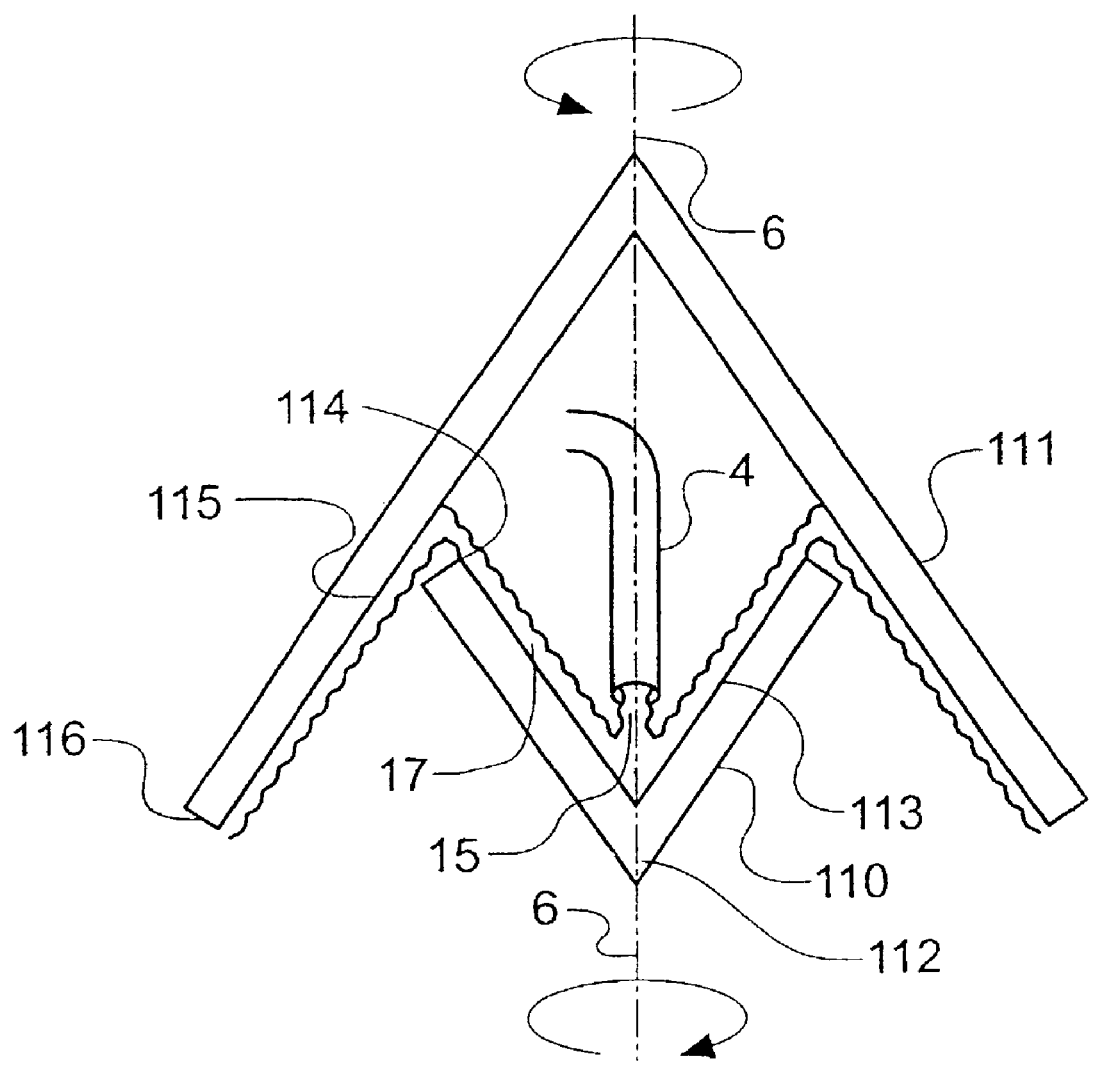
FIG. 12 shows a pair of conical rotating support elements.

FIG. 12 shows a detail of a reactor having two support members in the form of a first, smaller cone (110) and a second, larger cone (111) inside which the first cone (110) is located. The cones (110, 111) are arranged in opposition to each other and coaxially rotatably mounted on an axis of rotation (6). Reactant (15) is supplied by a feed (4) to an apex (112) of the first cone (110), and then spreads over an inner surface (113) of the cone (110) in the form of a film (17) as the cone (110) is rotated. When the reactant (15) reaches a base (114) of the cone (110), it is thrown onto an inner surface (115) of the second cone (111), which is also rotating. The reactant (15) then travels as a film (17) towards a base (116) of the second cone (111) from where it is thrown into a collector (not shown). Alternatively, further cones (not shown) of gradually increasing size may be provided in a similar configuration to the first and second cones (110, 111). The cones (110, 111) may co- or counter-rotate.

Figure 13:
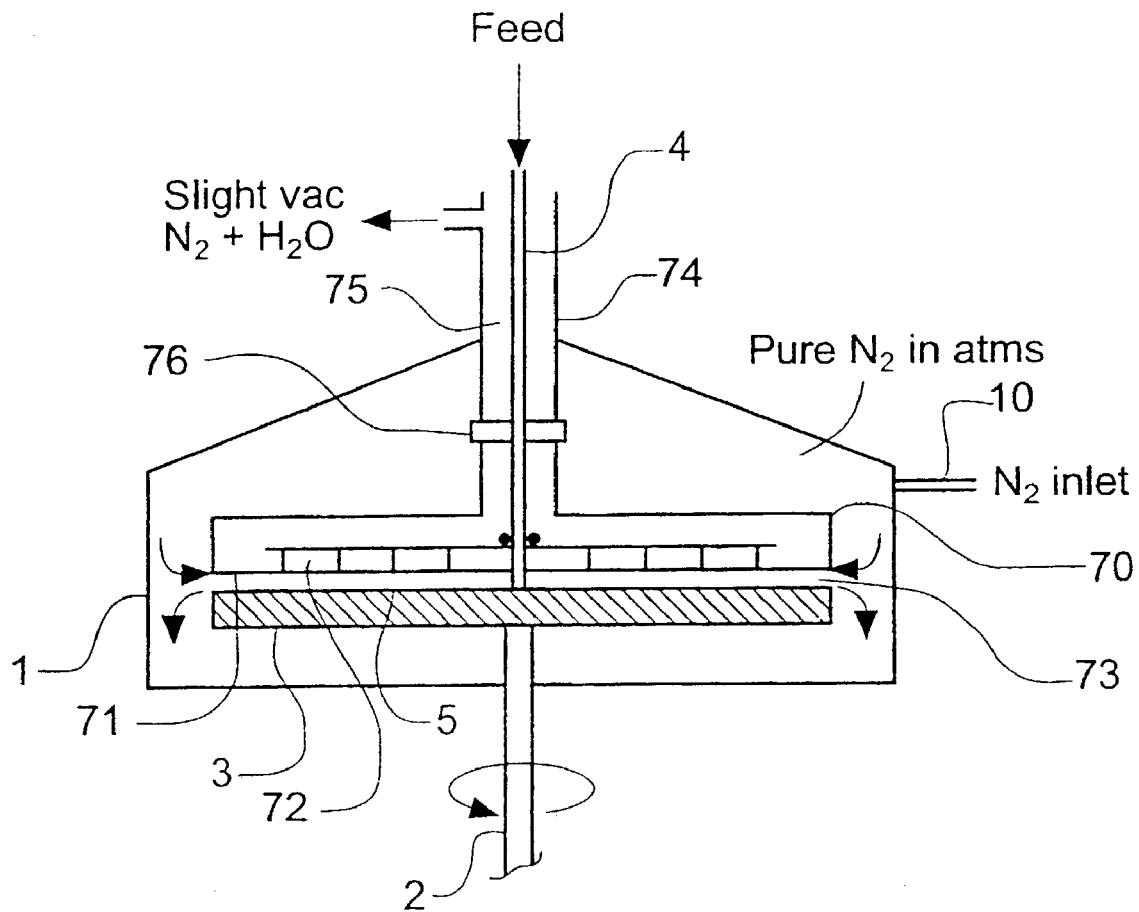
FIG. 13 shows a spinning disc provided with a rotary impeller.

FIG. 13 shows a spinning disc (3) with a surface (5) mounted on a drive shaft (2) inside a vessel (1) and provided with a feed (4) for a liquid phase reactant, such as an organic prepolymer. A rotary impeller (70) is mounted coaxially with the disc (3) and close to the surface (5), and a surface (71) of the impeller (70) facing the surface (5) is provided with vanes (72). A gaseous phase reactant, such as nitrogen, is supplied to the vessel (1) through an inlet (10). Upon rotation of the disc (3), the liquid phase reactant moves from the centre of the surface (5) towards the periphery thereof as described above. When the impeller (70) is appropriately rotated on a drive shaft (74), the gaseous phase reactant is sucked into the space (73) between the impeller (70) and the surface (5) and moves towards the centre of the surface (5) against the flow of liquid phase reactant, thereby improving mass and/or heat transfer characteristics. Gaseous phase reactant and unwanted reaction by-products may be removed from the central region of the space (73) by way of a discharge pipe (75) to which at least a partial vacuum may be applied. A partial seal (76), in the discharge pipe (75) may be provided so as to control the rate of gaseous phase reactant and byproduct removal.

EXAMPLE 1

Polymerisation of Ethylene Using a Catalyst Coated Disc

Phillips catalyst was coated onto the surface of a spinning disc apparatus using methods as described hereinbefore. The coated disc was mounted in a spinning disc apparatus.

The spinning disc apparatus used is shown in diagrammatic form in FIG. 1. The main components of interest being:

i) Top Disc—A smooth brass disc of thickness 17 mm and diameter 500 mm capable of rotating around a vertical axis.

ii) Liquid Distributor—A circular copper pipe of diameter 100 mm, positioned concentrically over the disc, sprayed fluid vertically onto the disc surface from 50 uniformly spaced holes in the underside. Flowrate was controlled manually by a valve and monitored using a metric 18 size, stainless steel float rotameter. A typical fluid flow rate was 31.3 cc/s.

iii) Motor—A variable speed d.c. motor capable of rotating at 3000 rpm was used. The rotational speed was varied using a digital controller calibrated for disc speeds between 0 and 1000 rpm. A typical rotational speed was 50 rpm.

iv) Radiant Heaters—3 radiant heaters (each consisting of two elements) spaced equally below the disc provided heat to the disc. The temperature was varied using a temperature controller for each heater. Each heater temperature could be controlled up to 400° C. Triac regulators were used to control the speed of the controller response. (These remained on setting 10 throughout the tests).

v) Thermocouples and Datascanner—16 K-type thermocouples embedded in the top disc gave an indication of the surface temperature profile along the disc radius. Odd numbered thermocouples 1 to 15 inclusive were embedded from underneath the disc to a distance 3 mm from the upper disc surface. Even numbered thermocouples, 2 to 16 inclusive were embedded from underneath the disc to a distance 10 mm from the upper disc surface. Each pair of thermocouple, i.e. 1 & 2 and 3 & 4 and 5 & 6 etc., were embedded adjacently at radial distances of 85 mm, 95 mm, 110 mm, 128 mm, 150 mm, 175 mm, 205 mm and 245 mm respectively (see FIG. 3). The thermocouples were connected to the datascanner which transmitted and logged the data to the PC at set intervals using the DALITE Configuration and Monitoring Software Package.

vi) Manual Thermocouple—A hand-held K-type thermocouple was used to measure the bulk fluid temperature on top of the disc.

The rig was used in two arrangements. In one arrangement, feed was constantly added and the heated product was sent to the collection trough. In an alternative arrangement the rig was assembled with a recycle.

The spinning disc apparatus of FIG. 1 was started up and temperature and rotational speed adjusted. When steady stage was achieved gaseous ethylene was fed to the revolving catalyst coated disc surface at it axis. Product was withdrawn in the collection trough at the periphery of the disc. Analysis revealed the product was high-grade polyethylene.

Further advantages of the invention are apparent from the foregoing.

What is claimed is:

1. A reactor apparatus including a pair of generally planar support elements (80,81) mounted coaxially on an axis of rotation (6) and having opposed facing surfaces, at least one of the support elements (80,81) being rotatable about the axis (6), characterised in that each facing surface is provided with a plurality of walls (84,85,86,87) which surround the axis of rotation (6) and which extend towards but do not contact the opposed facing surface, each wall (84,85,86,87) extending divergently from its surface towards the opposed surface with respect to the axis of rotation (6), the reactor being provided with feed means (4) for supplying at least one reactant to a region enclosed by the wall (84) closest to the axis (6), wherein the support elements are adapted for rotation at different velocities from each other.

2. A reactor apparatus including a first support element (110) adapted to be rotatable about an axis (6), the first support element (110) having at least one surface (113), feed means (4) for supplying at least one reactant (15) to the at least one surface (113) of the first support element (110) and collector means for collecting product from the at least one surface (113) of the first support element (110), wherein the collector means comprises a second support element (111) adapted to be rotatable about an axis (6) and having at least one surface (115) adapted to receive product from the first element (110), characterised in that the at least one surface (115) of the second support element (111) is shaped so as to surround a periphery (114) of the at least one surface (113) of the first support element (110), wherein the support elements are adapted for rotation at different velocities from each other.

3. A reactor apparatus as claimed in claim 2, wherein the first and second support elements (110,111) are formed as a pair of facing cones.

4. A apparatus reactor as claimed in claim 2, wherein the first and second support elements (110,111) are coaxial.

5. A reactor apparatus as claimed in claim 1, wherein the support elements (80,81;110,111) are adapted for co-rotation.

6. A reactor apparatus as claimed in claim 1, wherein the support elements (80,81;110,111) are adapted for counter-rotation.

7. A reactor apparatus as claimed in claim 2, wherein at least a portion of the collector means displays catalytic activity with respect to the product.

8. A reactor apparatus as claimed in claim 2, wherein the collector means includes means for heating or cooling product in the collection means to a predetermined temperature.

9. A reactor apparatus as claimed in claim 2, wherein the collector means is provided with feed means for adding a reactant to product collected therein.

10. A reactor apparatus as claimed in claim 1, wherein at least one wall (84,85,86,87) or surface (113,115) is coated or otherwise provided with a catalytic material.

11. A reactor apparatus as claimed in claim 1, further including means for applying vibration to the support elements (80,81;110,111).

12. A reactor apparatus as claimed in claim 1, wherein the walls (84,85,86,87) on each facing surface are concentric.

13. A reactor apparatus including a pair of generally planar support elements (80,81) mounted coaxially on an axis of rotation (6) and having opposed facing surfaces, at least one of the support elements (80,81) being rotatable about the axis (6), characterised in that each facing surface is provided with a plurality of substantially concentric walls (84,85,86,87) which surround the axis of rotation (6) and which extend towards but do not contact the opposed facing surface, each wall (84,85,86,87) extending divergently from its surface towards the opposed surface with respect to the axis of rotation (6), the reactor being provided with feed means (4) for supplying at least one reactant to a region enclosed by the wall (84) closest to the axis (6), wherein the support elements are adapted for rotation at different velocities from each other.

* * * * *